S. P. M. TASKER.
Metal Tube Cutter.
No. 103,685.
Patented May 31, 1870.
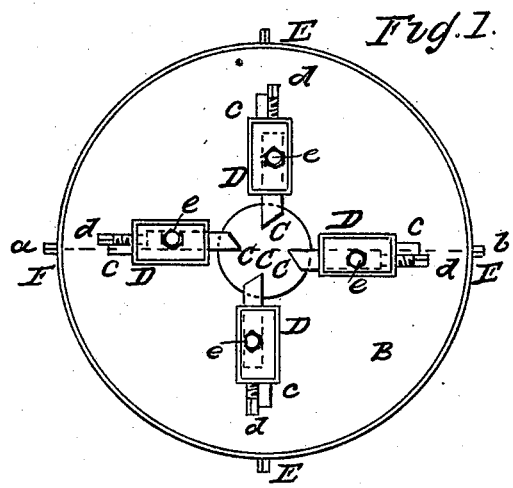
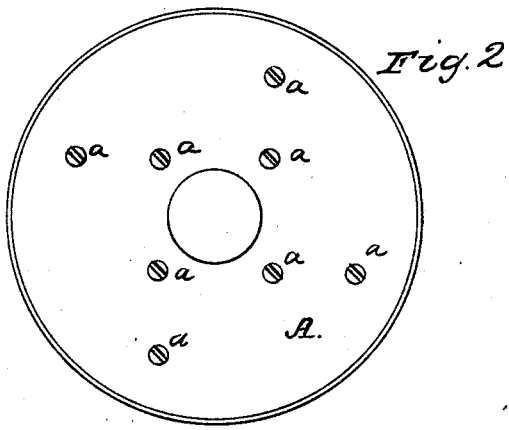
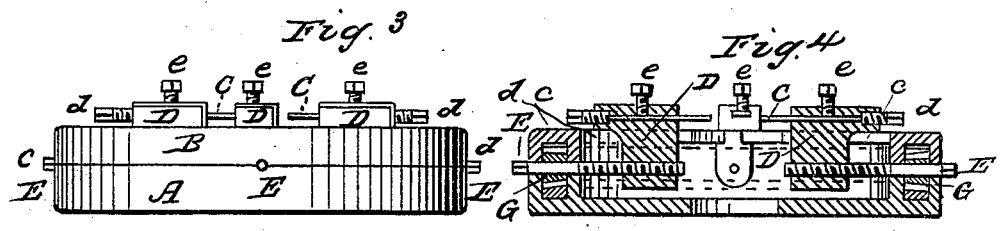
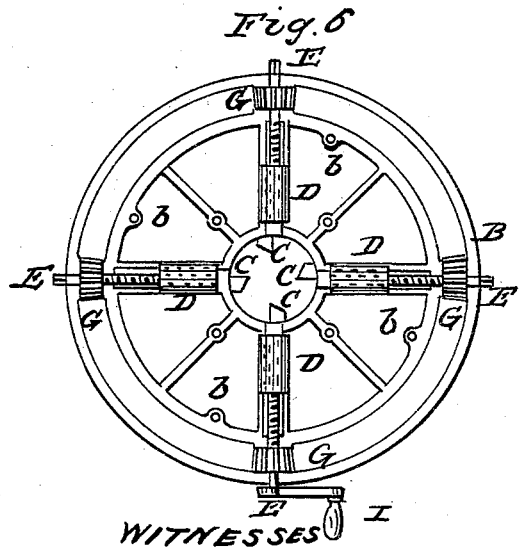
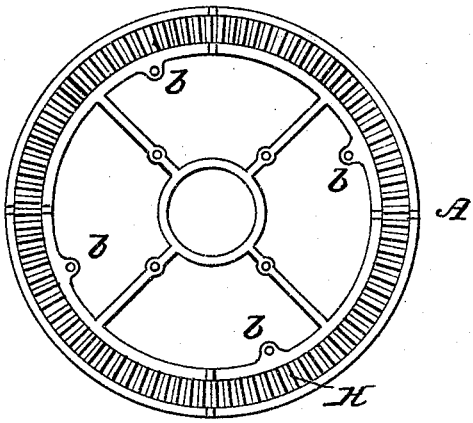
WITNESSES
Samuel H. Kumer
Thomas J. Bewley
INVENTOR
Stephen P. M. Tasker
By his Attorney
Stephen Ustick

United States Patent Office.

STEPHEN P. M. TASKER, OF PHILADELPHIA, PENNSYLVANIA.

Letters Patent No. 103,685, dated May 31, 1870.

IMPROVED DEVICE FOR CUTTING OFF METALLIC TUBES.

The Schedule referred to in these Letters Patent and making part of the same.

I, STEPHEN P. M. TASKER, of the city of Philadelphia and State of Pennsylvania, have invented certain Improvements in Tools for Cutting Off Metal Tubes, and Cutting Annular Grooves in Cylinders, of which the following is a specification.

A saw or single cutter is generally used in cutting off metal tubes. In large establishments this is too slow a process.

My improvement has for its object greater expedition.

It consists in the combination of two or more cutters in a head or stock, which has a central opening to receive the tube, the cutters being opened radially, and arranged in the same plane, and being connected with slides which move in radial slots in the cutter-head, and which are adjustable by means of screws, in their relative position from the center of the head.

These slides are operated simultaneously, after the manner of a universal chuck, by means of radial screw-rods, which are provided with pinions which work in an annular rack, so that by turning one of the rods, and thus moving the rack, the whole series of rods are operated in the same velocity, whereby the cutters are moved toward or from the center of the cutter-head, equally for cutting off the tube, or removing the cutters to an outward position for its removal.

If it is desired to move the cutters with different velocities, I construct the threads of the screw-rods with corresponding different pitches.

To enable others skilled in the art to which my improvement appertains to make and use my invention, I will now give a detailed description thereof.

In the accompanying drawing which make a part of this specification—

Figure 1 is a plan view of the improved tool.
Figure 2 is a reverse plan of the same.
Figure 3 is an edge view.
Figure 4 is a cross-section at the line $a\ b$ of fig. 1.
Figure 5 is an interior face view of the bed-plate A and annular rack H.
Figure 6 is a like view of the cap B, and parts attached.

Like letters in all the figures indicate the same parts.

A is the bed-plate, and
B the cap, shown respectively in detail in figs. 5 and 6.

The two plates meet at the line $c\ d$, of fig. 3, and are secured by means of the screws $a$, seen in fig. 2, the screw-holes $b$ being seen in figs. 5 and 6.

I use two or more cutters, C, for cutting off the tube, which I combine with the cap-piece B, they being connected with cutter-box slides D, and adjustable therein by means of the screws $d$, against which the outer ends of the cutters rest.

They are secured firmly in their adjusted position with the said slide by means of the screws $e$.

This arrangement of the cutters is shown in detail in figs. 1, 3, and 4.

For giving the cutters C a simultaneous and equal movement inward and outward, for cutting off the tubes and removing the cutters from the same for their removal, I connect with the cutter-box slides D, radial screw-rods, E, which are provided with pinions, G, that gear into the annular rack H situated in the groove $f$ of the bed-plate A, as represented in fig. 4.

On the said outer end of one of the rods E, I place a crank, I, the turning of which communicates an equal movement to all the rods E of the series, by virtue of their gearing with the annular rack H above described.

If I wish to give an increased movement to the cutters C, I give a corresponding variation to the pitches of the threads of the screw-rods E.

In the drawing I have represented four cutters, C, but it will be seen that the same arrangement will apply to any desirable number of cutters.

The cutter-head may be made to revolve around a stationary tube, or the order may be reversed without varying the construction of the tool, as may be found most desirable.

The improved tool may be advantageously used for cutting annular grooves in cylinders.

I do not confine myself to the mode of operating the cutters C, as other modes will answer the purpose.

Neither do I claim broadly the employment of a device for giving an inward and outward movement to the cutters after the manner of a universal chuck, as I am aware that such a device has been used in the patent of Eli Horton, for lathe-chuck, dated November 13, 1855; in the patent of S. N. Baker for turning-lathe for turning irregular forms, dated July 28, 1857; the turning-tool of L. F. Goodyear, dated March 29, 1859; the centering-device of Edwin P. Lazell, dated September 15, 1868; and the patent of William Tweedle, for making plugs for gas and water cocks, dated April 20, 1869.

These devices are, however constructed differently from mine, and operate in a different manner, and for a different purpose.

I am aware that combinations of devices substantially identical with slides D, screw-rods E, pinions C, and annular rack H, are old, and in common use.

What I claim as my improvement is—

The combination, with said combination of devices, of the cutter-boxes, cutters, adjusting and set-screws, substantially as set forth.

In testimony that the above is my invention, I have hereunto set my hand and affixed my seal this 15th day of February, 1870.

STEPHEN P. M. TASKER. [L. S.]

Witnesses:
    THOMAS J. BEWLEY,
    STEPHEN USTICK.